US009560047B1

(12) United States Patent
Long et al.

(10) Patent No.: US 9,560,047 B1
(45) Date of Patent: Jan. 31, 2017

(54) MULTI-DEVICE AUTHORIZATION TO ACCESS WIRELESS NETWORK COMMUNICATIONS BASED ON SHARED EVENT TIMES (75) Inventors: Kevin M. Long, Overland Park, KS (US); Robert L. Waldrop, Grandview, MO (US); M. Jeffrey Stone, Overland Park, KS (US); Jason M. Salge, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 765 days.

(21) Appl. No.: 13/481,384

(22) Filed: May 25, 2012

(51) Int. Cl.
| H04L 29/06 | (2006.01) |
| H04W 12/08 | (2009.01) |
| H04L 9/32 | (2006.01) |
| H04W 12/06 | (2009.01) |

(52) U.S. Cl.
CPC ......... *H04L 63/0876* (2013.01); *H04L 9/3297* (2013.01); *H04L 63/102* (2013.01); *H04W 12/06* (2013.01); *H04W 12/08* (2013.01)

(58) Field of Classification Search
CPC .. H04L 63/0876; H04L 63/102; H04L 9/3297; H04W 12/06; H04W 12/08
USPC ........................................ 726/4, 29; 380/271
See application file for complete search history.

(56) References Cited

U.S. PATENT DOCUMENTS

| 7,286,655 | B2 * | 10/2007 | Voorman | ............... G06Q 20/04 379/114.16 |
| 7,474,894 | B2 | 1/2009 | Cardina et al. | |
| 7,623,892 | B2 * | 11/2009 | Hawkins | ..................... 455/556.1 |
| 7,729,948 | B1 | 6/2010 | Gailloux et al. | |
| 7,844,297 | B2 * | 11/2010 | Hawkins | ..................... 455/556.1 |
| 7,979,087 | B2 * | 7/2011 | Hawkins | ..................... 455/556.1 |
| 8,090,406 | B2 * | 1/2012 | Hawkins | ..................... 455/556.1 |
| 8,103,308 | B2 * | 1/2012 | Jeffrey | ......................... 455/556.1 |
| 8,175,643 | B1 * | 5/2012 | Hawkins | ..................... 455/556.1 |
| 8,175,644 | B1 * | 5/2012 | Jeffrey | ......................... 455/556.1 |
| 8,238,973 | B2 * | 8/2012 | Kurz | ............................. 455/558 |
| 8,306,505 | B2 * | 11/2012 | Bennett | ........................ 455/411 |

(Continued)

OTHER PUBLICATIONS

Mantoro, Teddy; Milisic, Admir; "Smart Card Authentication for Internet Applications using NFC Enabled Phone", International Conference on Information and Communication Technology for the Muslim World, Dec. 13-14, 2010, 6 pages.*

(Continued)

*Primary Examiner* — Victor Lesniewski (57) ABSTRACT

In a wireless communication system, a first wireless device transfers an authorization request to an authorization server, and the authorization server authorizes the first wireless device to access a wireless communication network under a user service account. The first wireless device and the server store data indicating the first device identifier and an event time for a communication event that occurs for the first wireless device. The wireless device transfers data indicating a first device identifier and the event time to a second wireless device. The second wireless device transfers an authorization request to the authorization server that indicates a second device identifier, the first device identifier, and the event time. The authorization server determines that the event times match, and in response, authorizes the second wireless device to access the wireless communication network under the user service account.

20 Claims, 6 Drawing Sheets

(56) References Cited

U.S. PATENT DOCUMENTS

| | | | |
|---|---|---|---|
| 8,369,842 B2* | 2/2013 | Proctor, Jr. | G06Q 30/0623 |
| | | | 455/414.3 |
| 8,577,414 B2* | 11/2013 | Rajadurai et al. | 455/558 |
| 8,621,056 B2* | 12/2013 | Coussemaeker et al. | 709/223 |
| 8,627,075 B2* | 1/2014 | Ikeda et al. | 713/168 |
| 2005/0153741 A1 | 7/2005 | Chen et al. | |
| 2008/0081611 A1* | 4/2008 | Hoyt et al. | 455/425 |
| 2009/0037207 A1 | 2/2009 | Farah | |
| 2010/0088173 A1* | 4/2010 | Kulla et al. | 705/14.31 |
| 2010/0318686 A1* | 12/2010 | Ver Steeg | H04L 12/66 |
| | | | 710/8 |
| 2011/0167440 A1* | 7/2011 | Greenfield | 725/25 |
| 2012/0143978 A1* | 6/2012 | Coussemaeker et al. | 709/208 |
| 2012/0196587 A1* | 8/2012 | Tysowski | H04L 51/14 |
| | | | 455/418 |
| 2012/0278490 A1* | 11/2012 | Sennett et al. | 709/227 |
| 2013/0340044 A1* | 12/2013 | Litvin | G06F 21/41 |
| | | | 726/4 |

OTHER PUBLICATIONS

Thuan, Do Van; Jonvik, Tore; Jorstad, Ivar; Boning, Feng; Thanh, Do Van; "Strong authentication using dual SIM", International Conference on Intelligence in Next Generation Networks, Oct. 26-29, 2009, 4 pages.*

* cited by examiner

MULTI-DEVICE AUTHORIZATION TO ACCESS WIRELESS NETWORK COMMUNICATIONS BASED ON SHARED EVENT TIMES

TECHNICAL BACKGROUND

A wireless communication system provides wireless communication services to a user under their user service account. The wireless communication services may utilize Wireless Fidelity (WiFi), Long Term Evolution (LTE), Global System for Mobile Communications (GSM), Evolution Data Only (EVDO), Bluetooth, and the like. The user service account typically specifies device Identifiers (IDs) for the wireless communication devices that are authorized for service under the account. The device IDs may be Electronic Serial Numbers (ESNs), International Wireless Equipment IDs (IWEIs), Mobile Equipment IDs (MEIDs), and the like.

The wireless communication system uses an authorization server to determine whether a given wireless communication device is authorized to access wireless communication services under the user service account. The wireless communication device initially transfers its device ID to the wireless communication system which typically regenerates a corresponding authorization request for the authorization server. The authorization server checks the device ID in its database to ensure that the device ID is authorized for the user service account, and that the account is currently in good standing.

Many users operate multiple wireless communication devices under the same user service account. In some cases, the users may physically transfer electronic cards from device to device to transfer authorization capability. In other cases, the users may control multiple devices contemporaneously to communicate with the authentication server in parallel to transfer authorization capability from one device to another. Unfortunately, there is not a more efficient and effective way for the user to transfer authorization capability among multiple devices.

Technical Overview

In a wireless communication system, a first wireless device transfers an authorization request to an authorization server, and the authorization server authorizes the first wireless device to access a wireless communication network under a user service account. The first wireless device and the server store data indicating the first device identifier and an event time for a communication event that occurs for the first wireless device. The wireless device transfers data indicating a first device identifier and the event time to a second wireless device. The second wireless device transfers an authorization request to the authorization server that indicates a second device identifier, the first device identifier, and the event time. The authorization server determines that the event times match, and in response, authorizes the second wireless device to access the wireless communication network under the user service account.

DETAILED DESCRIPTION

Figure 1:
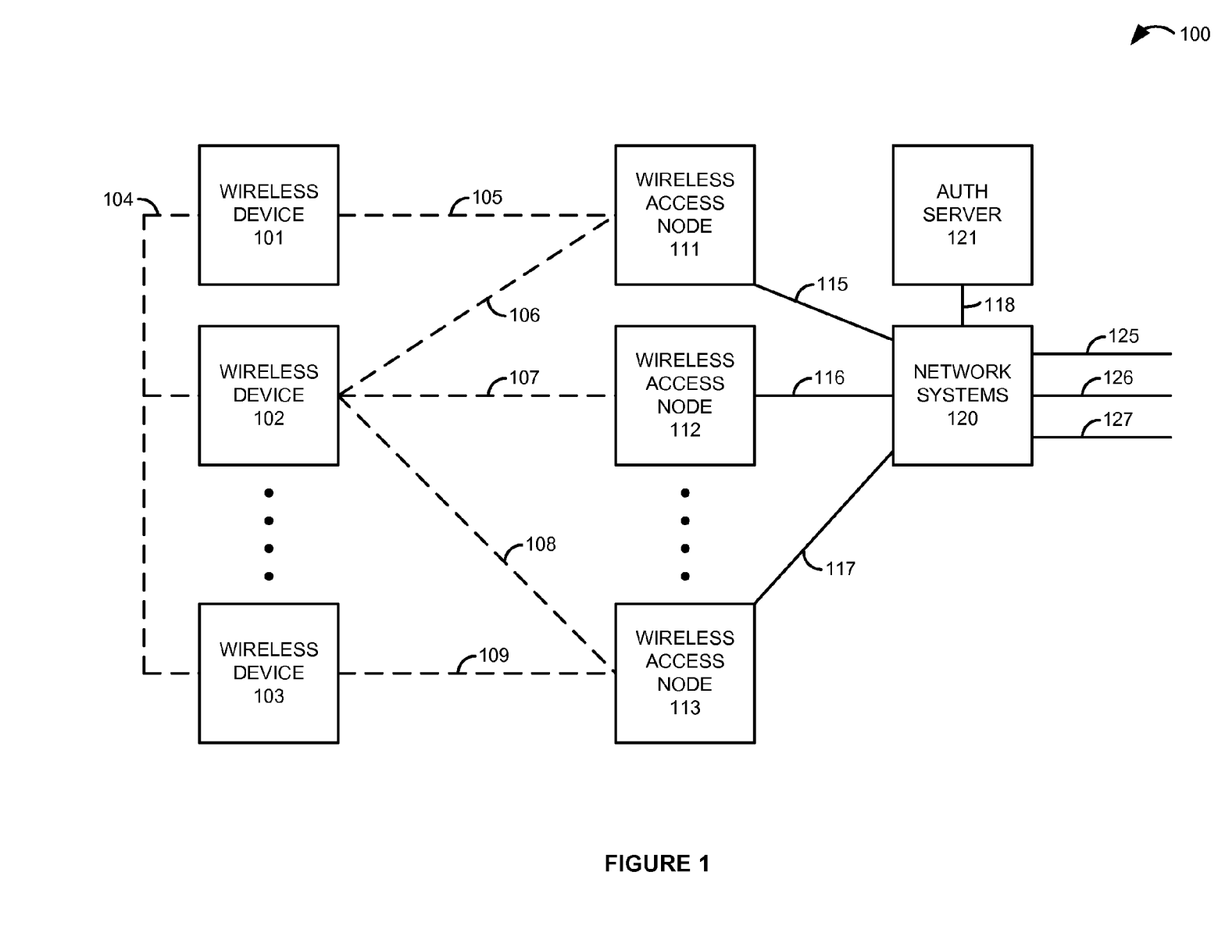
FIG. 1 illustrates a communication system to provide multi-device authorization for wireless communication services based on shared event times.

FIG. 1 illustrates communication system 100 to provide multi-device authorization for wireless communication services based on shared event times. Communication system 100 comprises wireless communication devices 101-103, wireless access nodes 111-113, network systems 120, and authorization server 121. Wireless communication devices 101-103 comprise smartphones, tablet computers, media players, plug-in wireless transceivers, and the like. Wireless communication devices 101-103 each have their own device ID, such as an IWEI, MEID, ESN, or some other identifying code.

Wireless access nodes 111-113 comprise base stations, hot-spots, or some other wireless network transceiver systems. Wireless communication devices 101-103 and wireless access nodes 111-113 exchange data over wireless communication links 105-109. Wireless communication links 105-109 utilize wireless communication protocols, such as WiFi, LTE, GSM, EVDO, Bluetooth, or some other format—including combinations thereof. Wireless communication links 105-109 utilize a wireless communication protocol, such as WiFi, LTE, GSM, EVDO, Bluetooth, or some other format—including combinations thereof.

Network systems 120 comprise various communication equipment and infrastructure, such as routers, gateways, controllers, servers, communication links, power systems, and the like. Network systems 120 communicate with wireless access nodes 111-113 over communication links 115-117, with authorization server 121 over communication link 118, and with other systems over communication links 125-127. Communication links 115-118 and 125-127 may be wireless or wire-line and may include intermediate networks, systems, and devices. Communication links 115-118 and 125-127 may use various communication protocols, such as Internet Protocol (IP), Ethernet, T1, and the like.

Authorization server 121 comprises a computer system that provides data processing, storage, and communications to authorize access to wireless communication services. Authorization server 121 communicates with various systems and devices over link 118 and network systems 120. Authorization server 121 maintains data for user service accounts including associated device IDs, event times, and other data.

Wireless communication devices 101-103 exchange data with one another over wireless communication links 104. Links 104 are depicted as a bus, but links 104 may take many forms. For example, wireless communication links 104 may comprise a direct Bluetooth link, a WiFi link through a hotspot, an LTE link through a public network, or some other form of machine-to-machine data communication capability. Thus, links 104 may use the other links, nodes, and systems shown on FIG. 1.

In operation, wireless communication device 101 transfers an authorization request to authorization server 121 indicating its device ID. Note that access node 111 and network systems 120 may reformat or regenerate this authorization request in between device 101 and authorization server 121. Authorization server 121 processes the authorization request to authorize wireless communication device 121 to access network systems 120 over wireless access node 111 under a given user service account—and this authorization may extend to other nodes and networks. Typically, the authorization entails checking the device ID in a database to ensure that the user service account is currently in good standing.

Wireless communication device 101 and authorization server 121 both store the device ID and an event time for wireless communication device 101. The event is typically a communication-related activity that is discoverable by both device 101 and server 121, such as a last access authorization, last call origination, last account activation, and the like. The event may comprise a series events, such as the last three authorization times. The event time is typically measured with a precise resolution of milliseconds or greater, and may be indicated through a hash or combination of the precise time with other data.

Wireless communication device 101 transfers the device ID and the event time to wireless communication device 102 over links 104. Note that this transfer over links 104 may use a direct wireless or wire-line link, links 105-108, or some other communication capability. The transfer may be directed by the user or be automatic. If automatic, the transfer may be triggered by the physical proximity of the devices, a change to the event time, or some other condition. Wireless communication device 102 stores the device ID and event time for wireless communication device 101.

Wireless communication device 102 then transfers an authorization request to authorization server 121 indicating its own device ID and also indicating the device ID and event time for device 101. Note that access nodes 111-113 and network systems 120 may reformat or regenerate this authorization request in between device 102 and authorization server 121. Authorization server 121 processes the authorization request to authorize wireless communication device 102 to access network systems 120 over wireless access nodes 111-113 under the same user service account as device 101—and the authorization may extend to other nodes and networks. To perform the authorization, authorization server 121 matches the device ID and event time for device 101 from the authorization request with the stored device ID and event time for the user service account. The authorization may also entail ensuring that the user service account is currently in good standing.

In response to the authorization, wireless communication device 102 then accesses wireless communication services over access nodes 111-113 and network systems 120. Note that the transfer and processing of event times and device IDs may comprise the transfer and processing of representations of these IDs and times, such as hashes, encryptions, or some other data format. In some examples, authorization server 121 de-authorizes wireless communication device 101 from access to wireless communication services under the user service account responsive to the authorization of wireless communication device 102. In other examples, wireless communication device 101 remains authorized, and authorization server 121 accounts for the simultaneous authorization of two devices on the user service account.

Figure 2:
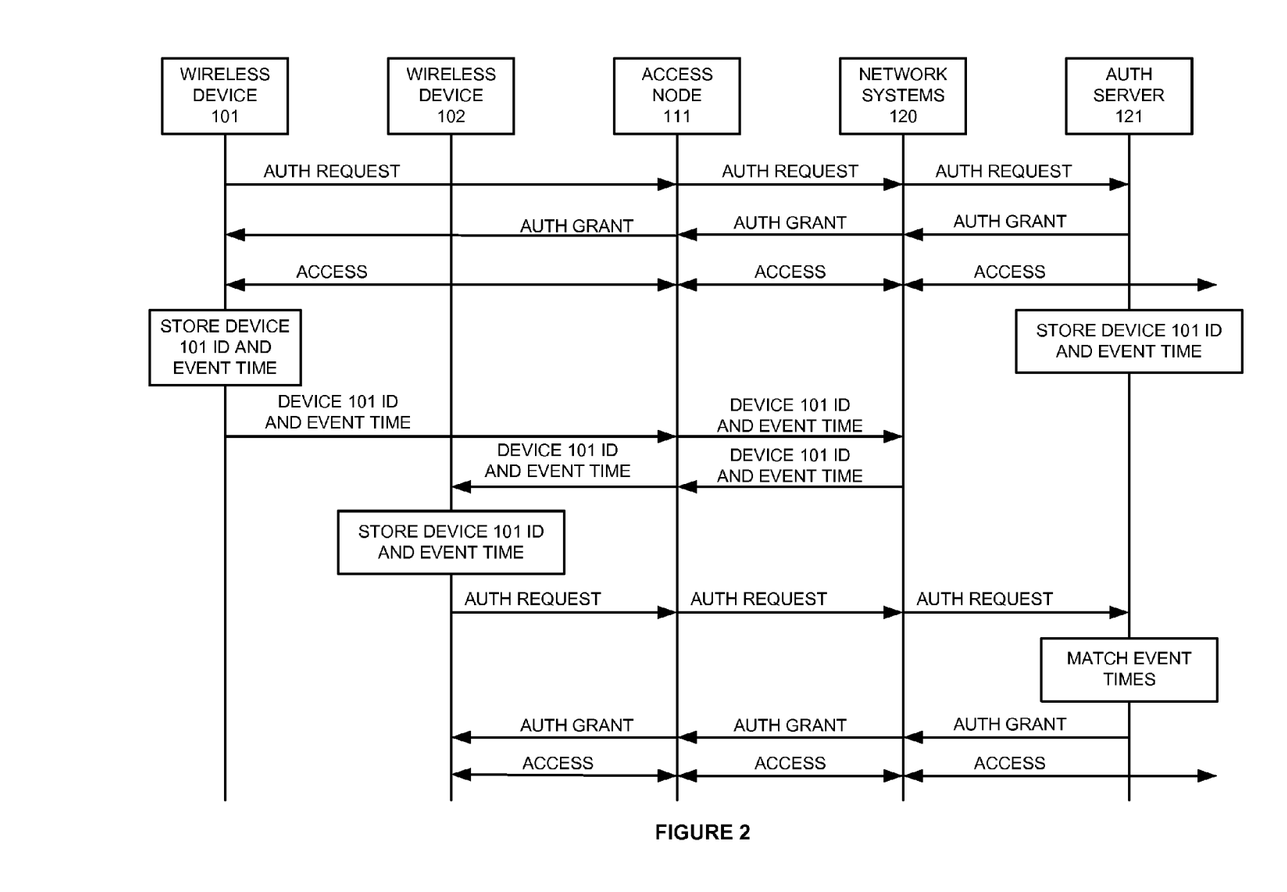
FIG. 2 illustrates the operation of a communication system to provide multi-device authorization for wireless communication services based on shared event times.

FIG. 2 illustrates the operation of communication system 100 to provide multi-device authorization for wireless communication services based on shared event times. Wireless communication device 101 transfers an authorization request indicating its device ID through node 111 and network systems 120 to authorization server 121. Authorization server 121 grants the authorization request for the associated user service account using the technique described herein or some other technique. Authorization server 121 then transfers an authorization grant back to wireless communication device 101 through network systems 120 and node 111—and note that systems 120 and node 111 may reformat or re-generate this authorization grant in between authorization server 121 and wireless communication device 101. Responsive to the authorization grant, access node 111 and network systems 120 provide wireless communication services to wireless communication device 101 under the user service account.

Wireless communication device 101 and authorization server 121 both store the device ID and an event time for wireless communication device 101. The event could be the last authorization, last call, and/or last activation, and could be measured with a resolution of milliseconds or greater. The event time may be a set of event times, and the event time may be combined or hashed with other data. Typically, device IDs and event times are stored and transferred as hash values.

Wireless communication device 101 transfers the device ID and the event time to wireless communication device 102 over access node 111 and network systems 120. This transfer may utilize WiFi, LTE, or another wireless network technology. The transfer may be directed by the user or be automatically triggered by the physical proximity of the user devices, a change to the event time, or a data transfer schedule. Wireless communication device 102 stores the device ID and event time for device 101. The device ID and the event time may be transferred and stored as hash values.

Wireless communication device 102 then transfers an authorization request to authorization server 121 over access node 111 and network systems 120. The authorization request indicates the device ID for device 102, and the request also indicates the device ID and event time for device 101. The IDs and event time may be represented as hash values.

Authorization server 121 processes the authorization request to authorize wireless communication device 102 to access network systems 120 over wireless access node 111 under the same user service account as device 101. To perform this authorization, authorization server 121 matches the device ID and event time for device 101 from the authorization request with the stored device ID and event time for the user service account. The authorization may also entail ensuring that the user service account is currently in good standing. Note that this match may be determined by matching hash values of the device IDs and the event times.

Authorization server 121 then transfers an authorization grant back to wireless communication device 102 through network systems 120 and node 111—note that systems 120 and node 111 may reformat or re-generate this authorization grant on the way. Responsive to the authorization grant, access nodes 111-113 and network systems 120 provide wireless communication services to wireless communication device 102 under the same user service account as wireless communication device 101. Note that wireless communication devices 101-102 may use different wireless protocols (LTE, WiFi, etc.) and access nodes 111-113 under the same user service account.

Figure 3:
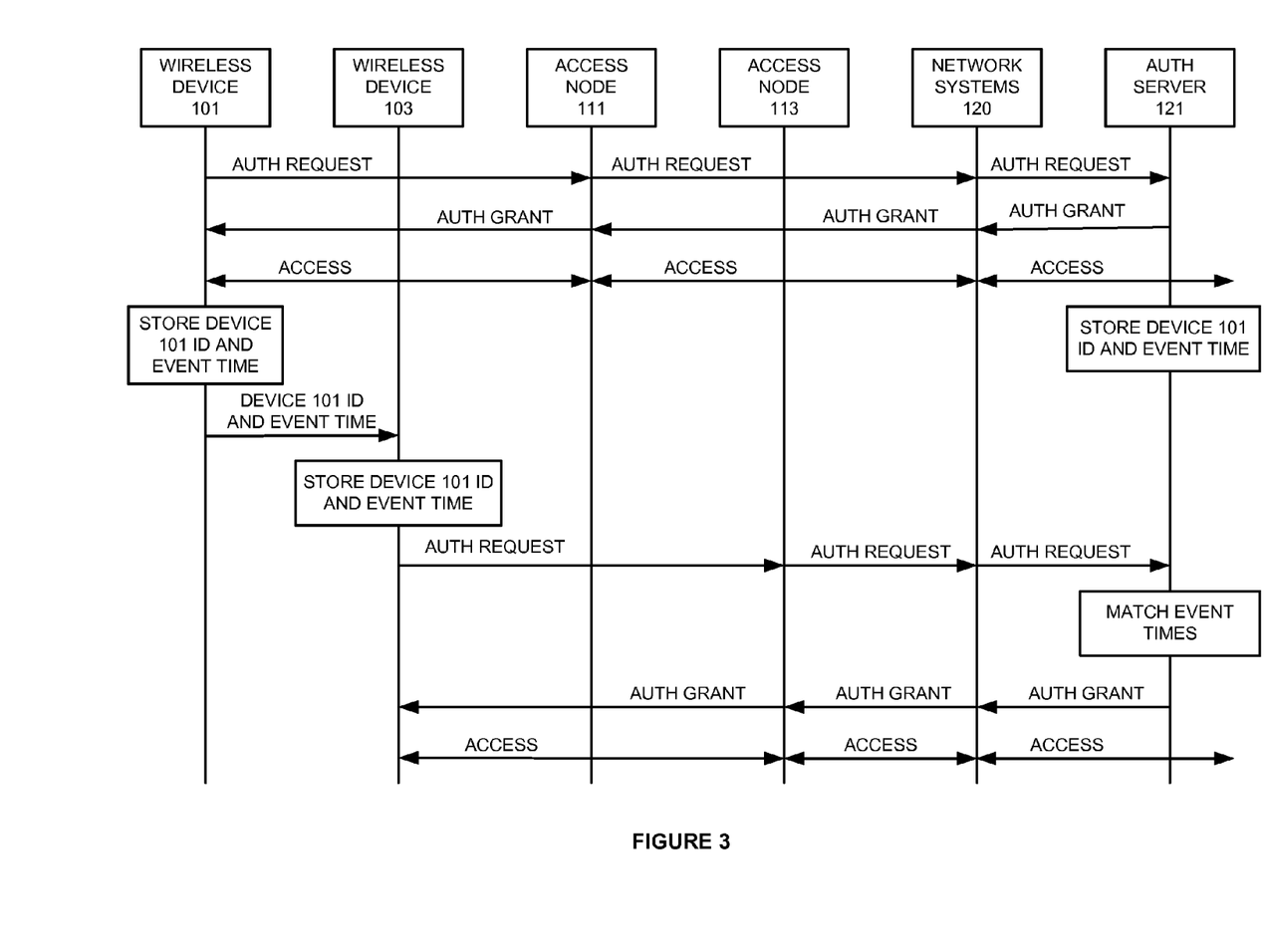
FIG. 3 illustrates the operation of a communication system to provide multi-device authorization for wireless communication services based on shared event times.

FIG. 3 illustrates the operation of communication system 100 to provide multi-device authorization for wireless communication services based on shared event times. Wireless communication device 101 transfers an authorization request indicating its device ID through node 111 and network systems 120 to authorization server 121. Authorization server 121 grants the authorization request for the associated user service account using the technique described herein or some other technique. Authorization server 121 then transfers an authorization grant back to wireless communication device 101 through network systems 120 and node 111. Responsive to the authorization grant, access node 111 and network systems 120 provide wireless communication services to wireless communication device 101 under the user service account.

Wireless communication device 101 and authorization server 121 both store the device ID and an event time for wireless communication device 101. The event could be the last authorization, last call, and/or last activation, and could be measured with a resolution of milliseconds or greater. The device ID and the event time may be stored as hash values.

Wireless communication device 101 transfers the device ID and the event time to wireless communication device 103 over a direct communication link. The direct link could be wire-line or wireless and utilize Bluetooth, Universal Serial Bus (USB), WiFi, infrared, and the like. The transfer may be directed by the user or be automatically triggered by the physical proximity of the devices, a change to the event time, or a pre-set transfer schedule. Wireless communication device 103 stores the device ID and event time for device 101. The device ID and the event time may be transferred and stored as hash values.

Wireless communication device 103 then transfers an authorization request to authorization server 121 over access node 113 and network systems 120. The authorization request indicates the device ID for device 103, and the request also indicates the device ID and event time for device 101. These IDs and time may be represented as hash values.

Authorization server 121 processes the authorization request to authorize wireless communication device 103 to access network systems 120 over wireless access node 113 under the same user service account as device 101. To perform this authorization, authorization server 121 matches the device ID and event time for device 101 from the authorization request with the stored device ID and event time for the user service account. The authorization may also entail ensuring that the user service account is currently in good standing. Note that this match may be determined by matching hash values of the device IDs and event times.

Authorization server 121 then transfers an authorization grant back to wireless communication device 103 through network systems 120 and node 113. Responsive to the authorization grant, access node 113 and network systems 120 provide wireless communication services to wireless communication device 103 under the same user service account as wireless communication device 101. Note that wireless communication devices 101 and 103 may use different wireless protocols to access the wireless communication services from nodes 111-113 and systems 120.

Figure 4:
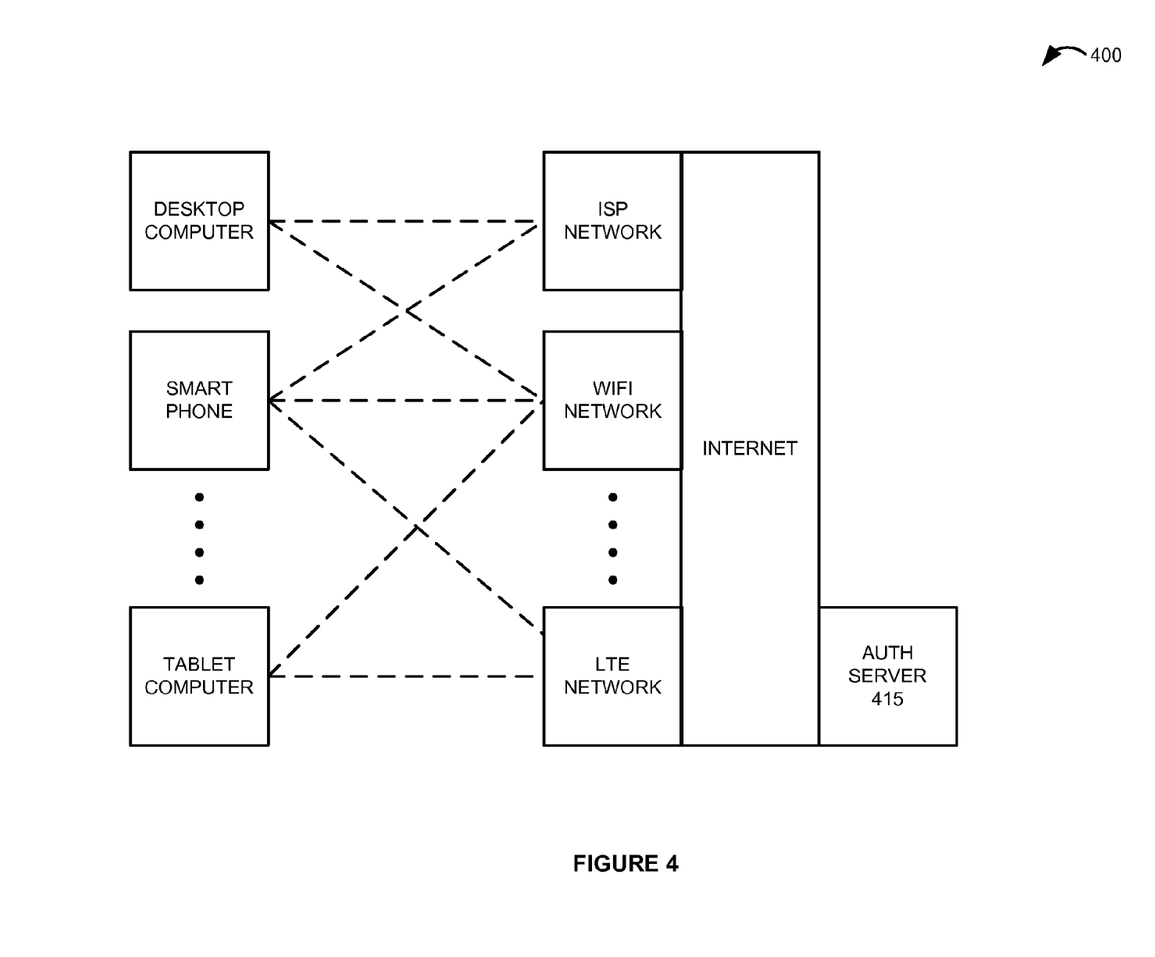
FIG. 4 illustrates a communication system to provide multi-device authorization for wireless communication services based on shared event times.

FIG. 4 illustrates communication system 400 to provide multi-device authorization for wireless communication services based on shared event times. Communication system 400 includes a set of user communication devices: a desktop computer, tablet computer, and a smartphone. Communication system 400 includes a set of communication networks that are coupled to the Internet: an Internet Service Provider (ISP), a WiFi network, and an LTE network. Communication system 400 also includes authorization server 415 coupled to the Internet.

The desktop computer, tablet computer, and smartphone each have a software application to facilitate multi-device authorization. The software application drives the user devices to obtain and share hash values for device IDs and event times over a near-field communication technology that requires physical proximity, such as Bluetooth. The user devices share new hash values when they are proximate and near-field communications are available. The software application drives the user devices to notify the user of their authorization status indicating if their stored-shared authorization data is current (and they are capable of authorization). The software application and authorization server 415 use similar coding schemes so they can generate the same hash values from the same underlying data.

Initially, authorization server 415 is programmed to authorize the device ID for the smartphone to access the Internet over the WiFi, LTE, and ISP networks under the user service account—perhaps during the sale of the smartphone to the user. During subsequent usage, the smartphone and authorization server 415 maintain hashes of the device ID and the last two authorization event times for the last two Internet access authorizations—possibly in addition to other factors.

Subsequently, the user purchases the tablet computer and loads the software application on the tablet computer. The software application drives the smartphone and tablet computer share device IDs, the last two authorization event times, and the currently authorized device. When the tablet computer requires Internet access, it transfers an authorization request indicating the hash values for the currently authorized device (the smartphone device ID), the new device to authorize (the tablet computer device ID), and the current event times (the last two authorization event times for the smartphone) to authorization server 415.

Authorization server 415 identifies the user service account based on the device ID of the currently authorized device (the smartphone device ID). Authorization server 415 matches the authorization event times from the tablet computer with the stored authorization event times for the user service account. Based on the matches, authorization server 415 authorizes the tablet computer for Internet access over the WiFi and LTE networks. Authorization server 415 may consider additional data before granting the authorization. The user may then access the Internet over the various networks with the tablet computer.

Both the tablet computer and authorization server 415 note this new authorization event time and subsequent event times, since they may be used for the future device authorizations. The tablet computer shares the authorization event times with the smartphone over near-field communications when the two devices are proximate. If the user again uses the smartphone to access the Internet, the smartphone transfers an authorization request to authorization server 415 indicating the hash values for the currently authorized device (the tablet computer ID), the new device to authorize (the smartphone device ID), and the current event times (the last two authorization event times) to authorization server 415.

Subsequently, the user purchases the desktop computer and loads the software application on the desktop computer. The application drives the desktop computer, tablet computer, and smartphone to share device IDs, registration event times, and the currently authorized device. When the desktop computer requires Internet access, it transfers an authorization request indicating the hash values for the currently authorized device, the new device to authorize (the desktop computer device ID), and the current event times to authorization server 415.

Authorization server 415 identifies the user service account based on the device ID of the currently authorized device in the request. Authorization server 415 matches the authorization event times received from the desktop computer with the stored authorization event times for the user service account. Based on the matches, authorization server 415 authorizes the desktop computer for Internet access over the WiFi and ISP networks. Authorization server 415 may consider additional data before granting authorization. The user may then access the Internet over the various networks with the desktop computer.

Note that the user devices need not be authorized to use all access networks, although they could be. Also note that other dynamically changing data may be used in addition to or in compliment of the event time data. Examples of such data include the last base station used, reported radio conditions (pilot signal strength), last call type, recent acknowledgement tokens and times, recent payment amounts and times, recent call times. Multiples could also be used, such as a combination of the last authorization time and the last acknowledgment token time.

Figure 5:
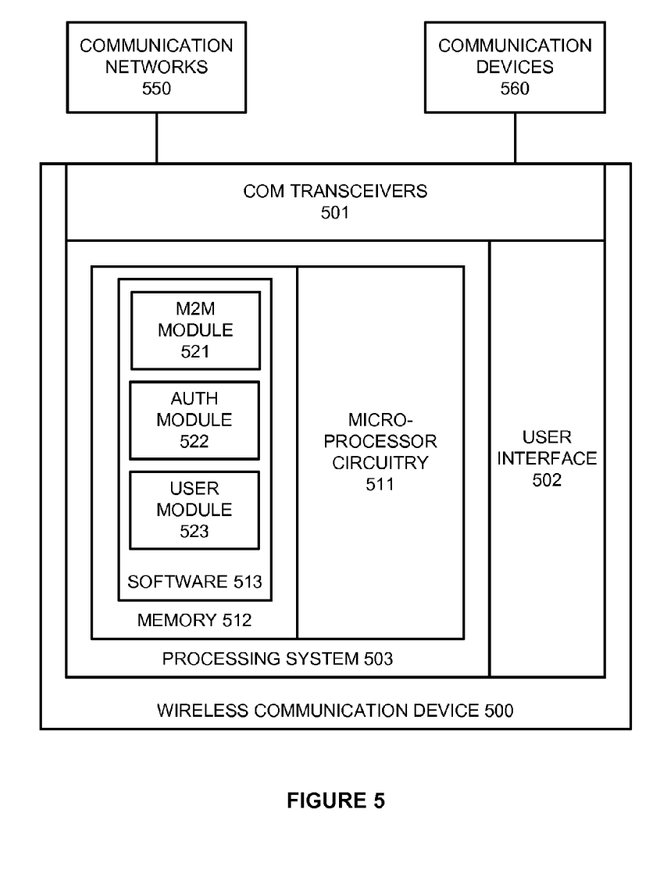
FIG. 5 illustrates a wireless communication device to provide multi-device authorization for wireless communication services based on shared event times.

FIG. 5 illustrates wireless communication device 500 to provide multi-device authorization for wireless communication services based on shared event times. Wireless communication device 500 is an example of the user devices on FIGS. 1 and 4, although these devices may use alternative devices and configurations. Wireless communication device 500 comprises communication transceivers 501, user interface 502, and processing system 503. Processing system 503 comprises micro-processing circuitry 511 and memory 512. Memory 512 stores software 513. Some conventional aspects of device 500 are omitted for clarity, such as power supplies, enclosures, and the like.

Communication transceivers 501 comprise communication components, such as ports, circuitry, memory, software, and links. For wireless radio communications, the components may include antennas, amplifiers, filters, modulators, signal processors, and the like. In some examples, the radio communications include multiple transceiver sub-systems for near-field, local network, and wide-area network data communications. Communication transceivers 501 exchange hash values for device IDs and event times with other communication devices 560. These communications typically occur over near-field communications. Communication transceivers 501 exchange hash values for device IDs and event times with an authorization server over communication networks 550. These communications typically occur over local or wide area communication networks. Communication transceivers 501 also exchange user data (voice, video, messages, web pages) over communication networks 550.

User interface 502 includes components to interact with a human operator, such as a touch display, speaker, microphone, camera, buttons, and switches. User interface 502 may be simplified or omitted in some examples.

Micro-processor circuitry 511 comprises a circuit board that holds integrated circuit chips and associated electronics. Memory 512 comprises a non-transitory, computer-readable, data storage medium, such as a flash drive, disc drive, and the like. Software 513 comprises computer-readable instructions that control the operation of micro-processor circuitry 511 when executed. Software 513 includes modules 521-523 and may also include operating systems, applications, utilities, databases, and the like.

When executed by circuitry 511, M2M module 521 directs circuitry 511 to drive transceivers 501 to exchange hash values for device IDs (indicating the currently authorized device) and a set of event times and other data with other communication devices 560. When executed by circuitry 511, authorization module 522 directs circuitry 511 to drive transceivers 501 to exchange hash values for device IDs (indicating the currently authorized device) and a set of event times and other data with an authorization server over communication networks 550. When executed by circuitry 511, user module 523 directs circuitry 511 to drive user interface 502 to provide information to a user indicating the user devices with current authorization capability, the user devices without current authorization data, and the currently authorized user device. When executed by circuitry 511, user module 523 directs circuitry 511 to drive user interface 502 to receive a user selection of the user devices to add, delete, and authorize.

Figure 6:
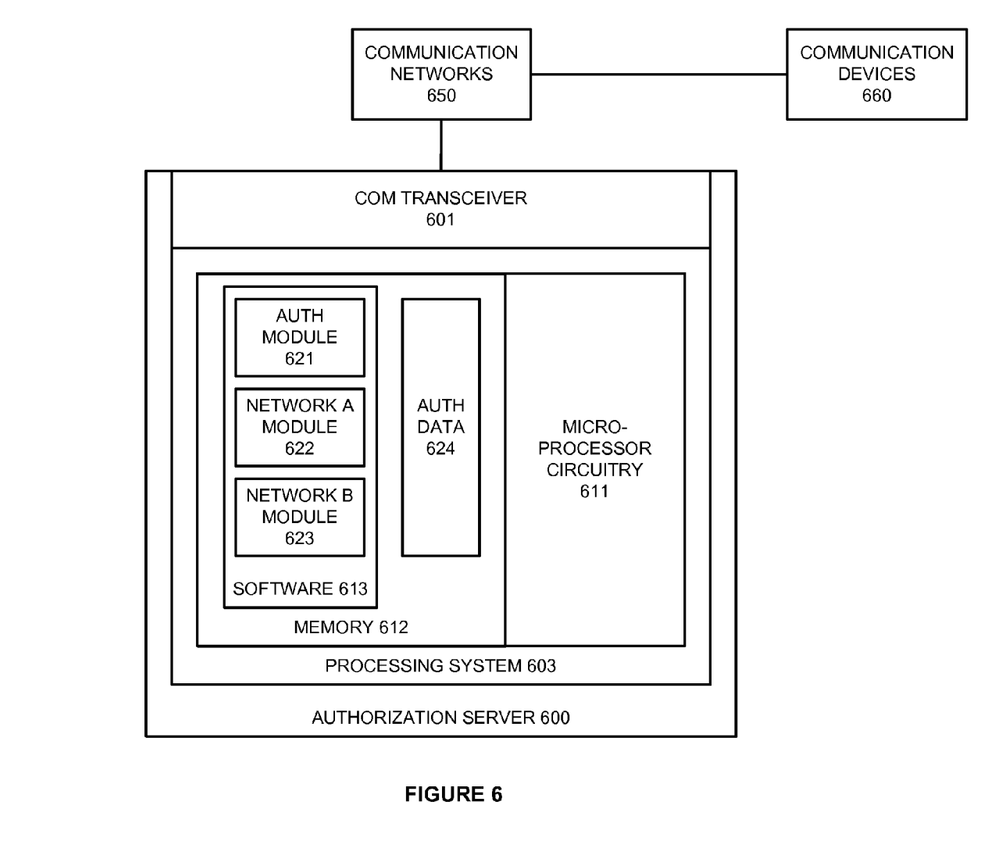
FIG. 6 illustrates an authorization server to provide multi-device authorization for wireless communication services based on shared event times.

FIG. 6 illustrates authorization server 600 to provide multi-device authorization for wireless communication services based on shared event times. Authorization server 600 is an example of the authorization servers on FIGS. 1 and 4, although these servers may use alternative devices and configurations. Authorization server 600 comprises communication transceiver 601 and processing system 603. Processing system 603 comprises micro-processing circuitry 611 and memory 612. Memory 612 stores software 613. Authorization server 600 and its components may be integrated onto a single platform or may be distributed across multiple diverse computer systems. Some conventional aspects of server 600 are omitted for clarity, such as power supplies, enclosures, and the like.

Communication transceiver 601 comprises communication components, such as ports, circuitry, memory, software, and links. Communication transceiver 501 receives authorization requests over communication networks 650 indicating hash values for device IDs and event times. These requests are initiated by communication devices 660 and may be reformatted or regenerated by networks 650 along the way. Communication transceiver 601 transfers authorization grants which are acted on by communication networks 650.

Micro-processor circuitry 611 comprises circuit boards that hold integrated circuitry and associated electronics. Memory 612 comprises a non-transitory, computer-readable, data storage media, such as flash drives, disc drives, and the like. Software 613 comprises computer-readable instructions that control the operation of micro-processor circuitry 612 when executed. Software 613 includes modules 621-623 and may also include operating systems, applications, utilities, databases, and the like.

When executed by circuitry 611, authorization module 621 directs circuitry 611 to grant authorization requests by processing device IDs and event times as described herein. When executed by circuitry 611, network A module 622 directs circuitry 611 to drive transceivers 601 to exchange authorization requests and grants with Network A in networks 650. When executed by circuitry 611, network B module 623 directs circuitry 611 to drive transceivers 601 to exchange authorization requests and grants with Network B in networks 650.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication system to control access, the method comprising:
in a first wireless communication device having a first device identifier, transferring a first authorization request for delivery to an authorization server;
in the authorization server, processing the first authorization request to authorize the first wireless communication device to access the wireless communication network under a user service account;
in the first wireless communication device and in the authorization server, storing user account data indicating the first device identifier and representing an event time for the first wireless communication device, wherein the event time comprises a time when a communication event occurred for the first wireless communication device;
transferring the user account data indicating the first device identifier and representing the event time from the first wireless communication device to a second wireless communication device having a second device identifier;
in the second wireless communication device, transferring a second authorization request for delivery to the authorization server, wherein the second authorization request indicates the second device identifier, the first device identifier, and represents the event time for the first wireless communication device;
in the authorization server, processing the stored user account data and the second authorization request to determine that the event time represented by the second authorization request matches the event time represented by the stored user account data, and in response, authorizing the second wireless communication device to access the wireless communication network under the user service account.

2. The method of claim 1 wherein the event time comprises a last call time for a last call by the first wireless communication device.

3. The method of claim 1 wherein the event time comprises a last authorization time for a last authorization by the first wireless communication device.

4. The method of claim 1 wherein determining that the event time represented by the second authorization request matches the event time represented by the stored user account data comprises determining if a first hash of the stored event time matches a second hash of the event time represented by the second authorization request.

5. The method of claim 1 wherein storing the user account data representing the event time in the authorization server comprises storing a first hash of the event time and wherein receiving the second authorization request representing the event time comprises receiving a second hash of the event time.

6. The method of claim 1 further comprising, in the authorization server, de-authorizing the first wireless communication device from access to the wireless communication network under the user service account responsive to authorizing the second wireless communication device.

7. The method of claim 1 wherein transferring the user account data from the first wireless communication device to the second wireless communication device comprises transferring the user account data responsive to an event time change to the user account data.

8. The method of claim 1 wherein transferring the user account data from the first wireless communication device to the second wireless communication device comprises transferring the user account data responsive to physical proximity between the first wireless communication device and the second wireless communication device allowing near field communications.

9. A method of operating an authorization server to control access to a wireless communication system, the method comprising:
in the authorization server, receiving a first authorization request transferred from a first wireless communication device having a first device identifier;
in the authorization server, processing the first authorization request to authorize the first wireless communication device to access the wireless communication network under a user service account;
in the authorization server, storing user account data indicating the first device identifier and representing an event time for the first wireless communication device, wherein the event time indicates a time when a communication event occurred for the first wireless communication device;
in the authorization server, receiving a second authorization request transferred from a second wireless communication device having a second device identifier, wherein the second authorization request indicates the second device identifier, the first device identifier, and represents the event time for the first wireless communication device; and
in the authorization server, processing the stored user account data and the second authorization request to determine that the event time represented by the second authorization request matches the event time represented by the stored user account information, and in response, authorizing the second wireless communication device to access the wireless communication network under the user service account.

10. The method of claim 9 wherein the event time comprises a last call time for a last call by the first wireless communication device.

11. The method of claim 9 wherein the event time comprises a last authorization time for a last authorization by the first wireless communication device.

12. The method of claim 9 wherein determining that the event time represented by the second authorization request matches the stored event time comprises determining if a first hash of the stored event time matches a second hash of the event time represented by the second authorization request.

13. The method of claim 9 wherein storing the user account data indicating the event time comprises storing a first hash of the event time and wherein receiving the second authorization request indicating event time comprises receiving a second hash of the event time.

14. The method of claim 9 further comprising, in the authorization server, de-authorizing the first wireless communication device from access to the wireless communication network under the user service account in response to authorizing the second wireless communication device.

15. A wireless communication system comprising:
a first wireless communication device having a first device identifier and configured to transfer a first authorization request for delivery to an authorization server;

an authorization server configured to process the first authorization request to authorize the first wireless communication device to access the wireless communication network under a user service account;

the first wireless communication device and the authorization server configured to store user account data indicating the first device identifier and an event time for the first wireless communication device indicating when a communication event occurred for the first wireless communication device;

a second wireless communication device having a second device identifier, wherein the first wireless communication device and the second wireless communication device are configured to transfer the user account data indicating the first device identifier and the event time from the first wireless communication device to the second wireless communication device;

the second wireless communication device configured to transfer a second authorization request for delivery to the authorization server, wherein the second authorization request indicates the second device identifier, the first device identifier, and the event time for the first wireless communication device;

the authorization server configured to process the stored user account data and the second authorization request to determine that the event time in the second authorization request matches the stored event time, and in response, to authorize the second wireless communication device to access the wireless communication network under the user service account.

16. The wireless communication system of claim 15 wherein the event time comprises at least one of a last call time for a last call by the first wireless communication device and a last authorization time for a last authorization by the first wireless communication device.

17. The wireless communication system of claim 15 wherein the authorization server is configured to determine that the event time in the second authorization request matches the stored event time by determining if a first hash of the stored event time matches a second hash of the event time in the second authorization request.

18. The wireless communication system of claim 15 wherein the authorization server is configured to de-authorize the first wireless communication device from access to the wireless communication network under the user service account in response to authorizing the second wireless communication device.

19. The wireless communication system of claim 15 wherein the first wireless communication device and the second wireless communication device are configured to transfer the user account data responsive to an event time change to the user account data.

20. The wireless communication system of claim 15 wherein the first wireless communication device and the second wireless communication device are configured to transfer the user account data responsive to physical proximity between the first wireless communication device and the second wireless communication device allowing near-field communications.

* * * * *